US010368132B2

(12) United States Patent
Barlaskar et al.

(10) Patent No.: US 10,368,132 B2
(45) Date of Patent: Jul. 30, 2019

(54) RECOMMENDATION SYSTEM TO ENHANCE VIDEO CONTENT RECOMMENDATION

(71) Applicant: Facebook, Inc., Menlo Park, CA (US)

(72) Inventors: Uzma Hussain Barlaskar, Berkeley, CA (US); Sahil P. Thaker, San Jose, CA (US); Babak Shakibi, Sunnyvale, CA (US); Tirunelveli R. Vishwanath, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 194 days.

(21) Appl. No.: 15/365,682

(22) Filed: Nov. 30, 2016

(65) Prior Publication Data

US 2018/0152763 A1    May 31, 2018

(51) Int. Cl.
*G06Q 30/00* (2012.01)
*H04N 21/466* (2011.01)
*G06Q 30/02* (2012.01)
*H04N 21/45* (2011.01)

(52) U.S. Cl.
CPC ..... *H04N 21/4668* (2013.01); *G06Q 30/0255* (2013.01); *G06Q 30/0269* (2013.01); *H04N 21/4532* (2013.01)

(58) Field of Classification Search
CPC .................................................. H04N 2/4668
USPC ....................................................... 705/14.53
See application file for complete search history.

(56) References Cited

U.S. PATENT DOCUMENTS

| 8,352,499 B2 * | 1/2013 | Bharat | G06F 17/30867 707/791 |
| 8,601,596 B2 * | 12/2013 | Wu | G06F 21/10 726/1 |
| 2011/0179114 A1 * | 7/2011 | Dilip | G06F 17/30867 709/204 |

OTHER PUBLICATIONS

Algorithms + Data Structures = Programs, 1976, pp. xii-55.*

(Continued)

*Primary Examiner* — Matthew T Sittner
*Assistant Examiner* — Michael I Ezewoko
(74) *Attorney, Agent, or Firm* — Fenwick & West LLP

(57) ABSTRACT

An online system provides video recommendations to a target user of the online system as a supplement to videos provided to the target user that were posted by the user's connections in the online system. The recommended videos are selected from publicly available video content and are likely to be of interest to the target user. The online system has video candidate generators that select video candidates based on a variety of selection criteria. The selected video candidates are filtered to identify inappropriate content or videos that the target user has already viewed for elimination from candidacy. The filtered video candidates are ranked based on weights of features of the video candidates. Based on the ranking, the online system selects videos above a threshold as recommendations to the target user.

22 Claims, 4 Drawing Sheets

(56) References Cited

OTHER PUBLICATIONS

Streetlights and Shadows, MIT Press, 2009, pp. 33-47.*
Things That Shape the Mind, Malfouris, MIT Press, 2013, pp. 57-149.*
Evocative Objects, Turkle, MIT Press, 2007, pp. 224-231.*
The future of the internet—and how to stop It, Yale University Press, 2008, Chapter(s) 1-9, [emphasis pp. 11-18].*
Modelling of Socio-Technical Systems, Dam, Springer, 2013, pp. v-73 (emphasis p. 36).*
Pattern Recognition, Theodoridis, Academic Press, 2009, pp. xv-9, 577-626.*
Graph Classification and Clustering Based on Vector Space Embedding, Riesen, World Scientific, 2010, pp. vii-14, 133-219.*

* cited by examiner

RECOMMENDATION SYSTEM TO ENHANCE VIDEO CONTENT RECOMMENDATION

BACKGROUND

1. Field of Art

This disclosure relates generally to recommending digital content to online system users, and particularly to selecting publicly available video content most likely to be of interest to a target user of an online system as a supplement to videos provided to the target user that were posted by the user's connections in the online system.

2. Description of the Related Art

An online system allows its users to connect to and communicate with other online system users. For example, an online system allows a user to curate content items, such as images or videos, and share the content items to other online system users. An online system user may establish a connection to other users, where the online system can present content items from the user to other online system users connected to the user providing the content items, encouraging interaction among the various users.

However, existing solutions merely present to a target user of an online system content items received from other users connected to the target user, e.g., videos that were posted by the other users connected to the target user. This may result in the target user being presented with content items in which the target user may have minimal or no interest, which, in turn, degrades user experience with the online system.

SUMMARY

An online system provides video recommendations to a target user of the online system, where the recommended videos are selected from publicly available video content and are likely to be of interest to the target user. The selected video recommendations are provided to the target user as a supplement to videos provided to the target user that were posted by the target user's connections in the online system (such as videos posted by a user's social network in a social networking system). In one embodiment, the selected video recommendations that are provided to the target user exclude the videos that were previously posted by the target user's connections in the online system. The online system has multiple video candidate generators that select video candidates for the target user based on a variety of selecting criteria, e.g., the viewing histories of other users connected to the target user on the online system and those of the target user, and taste for video content same or similar as the target user.

The selected videos from these video candidate generators are filtered, and video candidates containing inappropriate content or that the target user has already viewed are eliminated from candidacy. The video candidates that remain after the filtering are assigned ranks based on multiple factors including: ratio of number of likes over number of views, ratio of number of completed views over a total number of views, counters from the target user's interactions with the videos, tags and extracted topics from the videos, and the like. These ranking factors are weighed differently from one another to assign bias toward factors that are more closely related to the target user, e.g., videos associated with other users who share the same or similar taste or interest in video content. For example, a ratio of number of likes over number of views describing the general public has less weight than the same type of ratio describing the target user's social clusters of friends. Based on the ranking, the online system selects one or more video candidates and recommends the selected video candidates above a threshold to the target user for viewing.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
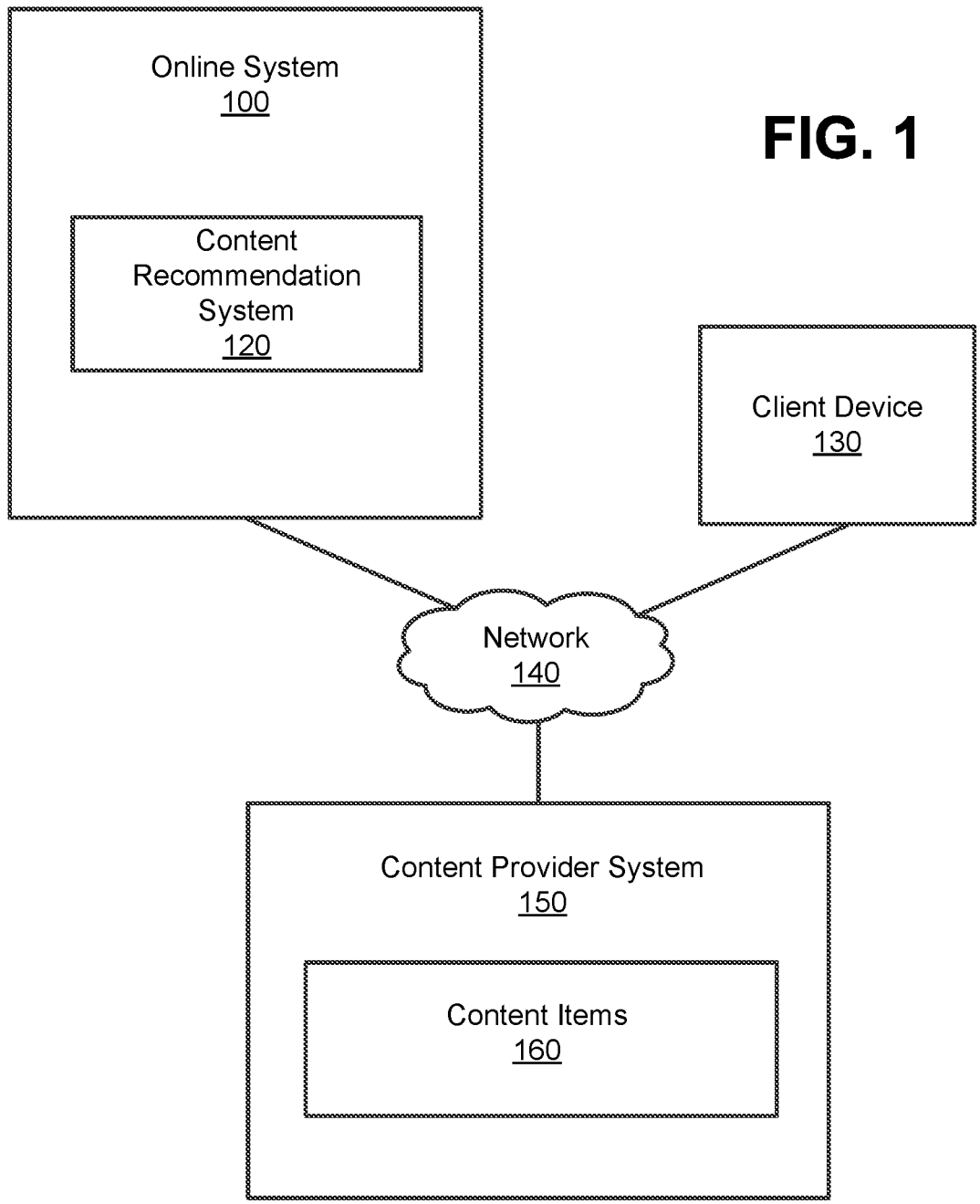
FIG. 1 is a block diagram of a system environment for providing recommendations of content items to users of an online system according to one embodiment.

FIG. 1 is a block diagram of a system environment for providing recommendations of content items to users of an online system according to one embodiment. The system environment includes an online system 100 (e.g., a social networking system), a client device 130, and a content provider system 150 connected to each other over a network 140. In other embodiments, different and/or additional entities can be included in the system environment.

The client device 130 is a computing device capable of receiving user input as well as transmitting and/or receiving data via the network 140. In one embodiment, a client device 130 is a conventional computer system, such as a desktop or laptop computer. Alternatively, a client device 130 may be a device having computer functionality, such as a personal digital assistant (PDA), a mobile telephone, a smartphone or another suitable device. A client device 130 is configured to communicate via the network 140. In one embodiment, a client device 130 executes an application allowing a user of the client device 130 to interact with the online system 100. For example, a client device 130 executes a browser application to enable interaction between the client device 130 and the online system 100 via the network 140. In another embodiment, a client device 130 interacts with the online system 100 through an application programming interface (API) running on a native operating system of the client device 130, such as IOS® or ANDROID™.

The content provider system 150 is used by content providers for interacting with the online system 100 and users of the client device 130. In one embodiment, a content provider system 150 is an application provider communicating information describing applications for execution by a client device 130 or communicating data to client devices 130 for use by an application executing on the client device 130. In other embodiments, a content provider system 150 provides content (e.g., videos and sponsored content) or other information for presentation via a client device 130. For example, the content provider system 150 provides a third party website that communicates information to the online system 100, such as sponsored content (e.g., movie trailers, advertisements) or information about an application provided by the content provider. The sponsored content may be created by the entity that owns the content provider system 150. Such an entity may be a company (e.g., a third party outside of the online system 100) offering a product, service, or message that the company wishes to promote.

In one embodiment, the content provider system 150 provides one or more content items 160 to the online system 100. The content items 160 are items of various types provided to a target user of the online system 100 by the content provider system 150. Examples of different types of content items 160 include videos that are publicly available on the Internet, images, photos, text/articles, or other types of digital content. Based on results generated by the content recommendation system 120, in addition to information stored about the target user, the online system 100 selects video content items that the target user is likely to find of interest.

The network 140 includes any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 100 includes a computing environment that allows users of the online system 100 to communicate or otherwise interact with each other and access content. The online system 100 stores information about the users, for example, user profile information and information about actions performed by users on the online system 100. In one embodiment, the online system 100 includes a content recommendation system 120 for selecting publicly available video content that is likely to be of interest to a target user as a supplement to videos provided to the target user that were posted by the user's connections in the online system 100. The content recommendation system 120 (further described with reference to FIG. 2 in Section III. Content Recommendation System) is a system that generates video content recommendations for a target user of the online system 100 based on criteria implemented by several recommendation modules within the system 100.

II. Online System

Figure 2:
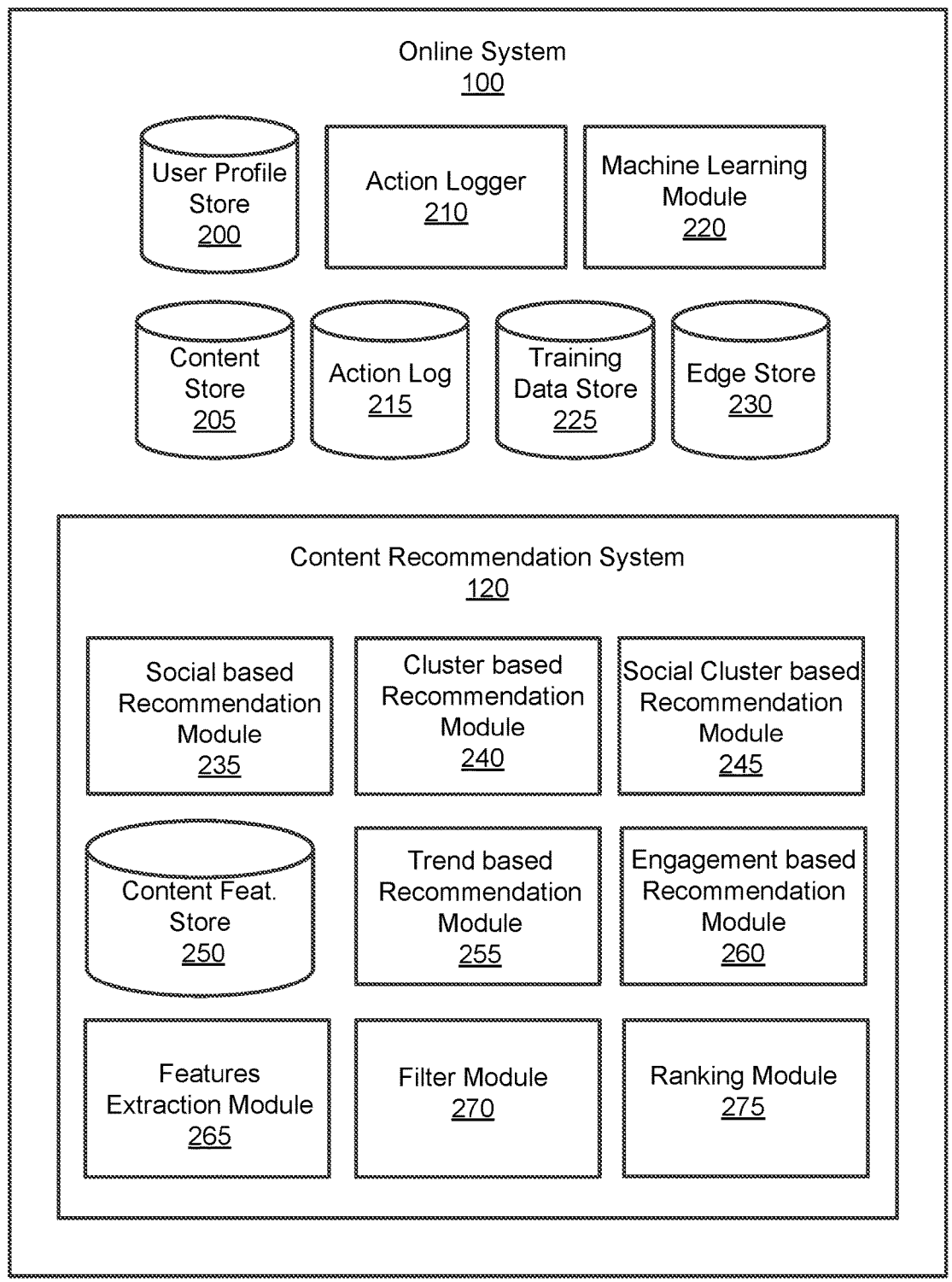
FIG. 2 is a block diagram of an online system for providing recommendations of content items according to one embodiment.

FIG. 2 is a block diagram of an online system 100 with a content recommendation system 120 according to one embodiment. In the embodiment illustrated in FIG. 2, the online system 100 includes a user profile store 200, content store 205, action logger 210, action log 215, machine learning module 220, training data store 225, edge store 230, and content recommendation system 120. The action logger 210 and the machine learning module 220 may perform in conjunction with each other or independently with the content item recommendation system 120 to generate video recommendations for users of the online system 100. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

Each user of the online system 100 is associated with a user profile, which is stored in the user profile store 200. A user profile includes declarative information about the user that was explicitly shared by the user and may also include profile information inferred by the online system 100. In one embodiment, a user profile of an online system user includes multiple data fields, each describing one or more attributes of user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, an image of a user may be tagged with information identifying the online system user displayed in an image. A user profile in the user profile store 200 may also maintain references to actions by the corresponding user performed on content items in the action log 215.

While user profiles in the user profile store 200 are frequently associated with individuals, allowing individuals to interact with each other via the online system 100, user profiles may also be stored for entities such as businesses or organizations. This allows an entity to establish a presence on the online system 100 for connecting and exchanging content with other online system 100 users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The content store 205 stores objects that represent various types of content. Examples of content represented by an object include a video, page post, status update, photograph, link, shared content item, gaming application achievement, check-in event at a local business, brand page, or any other type of content. Online system 100 users may create objects stored by the content store 205, such as status updates, photos tagged by users to be associated with other objects in the online system 100, events, groups or applications. In some embodiments, objects are received from third-party applications or third-party applications separate from the online system 100. In one embodiment, objects in the content store 205 represent single pieces of content or content "items." Hence, online system 100 users are encouraged to communicate with each other by posting text and content items of various types of media to the online system 100 through various communication channels. This increases the amount of interaction of users with each other and increases the frequency with which users interact within the online system 100.

The action logger 210 receives communications about user actions internal to and/or external to the online system 100, populating the action log 215 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 215.

The action log 215 may be used by the online system 100 to track user actions on the online system 100, as well as actions on third party systems that communicate information to the online system 100. Users may interact with various objects on the online system 100, and information describing these interactions is stored in the action log 215. Examples of interactions with objects include: viewing videos, commenting on posts, sharing links, checking-in to physical locations via a mobile device, accessing content items, and any other suitable interactions. Additional examples of interactions with objects on the online system 100 that are included in the action log 215 include: viewing videos posted by a user's connections in the online system 100, commenting on a photo album, communicating with a user, establishing a connection with an object, joining an event, joining a group, creating an event, authorizing an application, using an application, expressing a preference for an object ("liking" the object), and engaging in a transaction. Additionally, the action log 215 may record a user's interactions with sponsored content on the online system 100 as well as with other applications operating on the online system 100. In some embodiments, data from the action log 215 is used to infer interests or preferences of a user, augmenting the interests included in the user's user profile store 200 and allowing a more complete understanding of user preferences.

The action log 215 may also store user actions taken on a third party system, such as an external website, and communicated to the online system 100. For example, an e-commerce website may recognize a user of an online system 100 through a social plug-in enabling the e-commerce website to identify the user of the online system 100. Because users of the online system 100 are uniquely identifiable, e-commerce websites, such as in the preceding example, may communicate information about a user's actions outside of the online system 100 to the online system 100 for association with the user. Hence, the action log 215 may record information about actions users perform on a third party system, including webpage viewing histories, sponsored content that were engaged, purchases made, and other patterns from shopping and buying.

The machine learning module 220 trains one or more content recommendation models used by the recommendation modules 235-260 described below using features based on training data from the training data store 225. The machine learning module 220 can store the trained recommendation models in the online system 100 and periodically re-train the recommendation models using features based on updated training data. Example features include features associated with user profiles such as connections to other users, demographic information, actions performed by users of the online system on video content, and features associated with publicly available videos such as tags, descriptions, and sources of the videos. In some embodiments, the training data store 225 includes predetermined information about a population of users of the online system 100 provided to the online system 100 or from another module of the online system 100, e.g., the action log 215 or user profile store 200.

The machine learning module 220 retrieves training data from sources such as the training data store 225 and extracts features from the training data. The machine learning module 225 trains the recommendation models using the features. The training data includes information about publicly available videos in the Internet and videos published by the online system 100 and information about users of the online system 100 who interacted with the published videos. The features include one or more feature sets, e.g., a feature set on sources of the videos, and a feature set on user interactions.

In one embodiment, the machine learning module 220 trains a recommendation model for each recommendation module of the content recommendation system 120 based on features associated with videos analyzed by the recommendation module. For example, the machine learning module 220 trains a recommendation model for the social based recommendation module 235 for selecting videos from publicly available videos based on a social graph describing connections among users of the online system 100. In one embodiment, the machine learning module 220 trains the recommendation models using one or more machine learning algorithms such as neural networks, naive Bayes, and support vector machines with the training data stored in the training data store 225.

The machine learning module 220 also trains a model for the ranking module 275 of the content recommendation system 120 for assigning weights to different features associated with the users of the online system 100 and for assigning weight to different features associated with videos selected from the publicly available videos in the Internet. The ranking module 275 uses the trained model to calculate a ranking score for each video candidate based on the differently weighted features associated with the video candidate. The ranking module 275 is further described below.

In one embodiment, the edge store 230 stores information describing connections between users and other objects on the online system 100 as edges. Some edges may be defined by users, allowing users to specify their relationships with other users. For example, users may generate edges with other users that parallel the users' real-life relationships, such as friends, co-workers, partners, and so forth. In one embodiment, the user profile store 200 stores data describing the connections between different users of the online system 100, such as the number of friends shared between the users out of the total number of friends, the fraction of time since joining or becoming a member of the social networking system that overlaps between the two users (e.g., whether the users joined the online system at the same time or have an overlap for a certain period of time), or a combination of these signals. The record of users and their connections in the online system 100 may be called a "social graph."

Other edges are generated when users interact with objects in the online system 100, such as expressing interest in a page on the online system 100, sharing a link with other users of the online system 100, viewing videos posted by other users of the online system 100, and commenting on posts or videos provided by other users of the online system 100. The connections between users and other objects, or edges, can be unidirectional (e.g., a user following another user) or bidirectional (e.g., a user is a friend with another user).

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 100, or information describing demographic information about a user. Each feature may be associated with a source object or user, a target object or user, and a feature value. A feature may be specified as an expression based on values describing the source object or user, the target object or user, or interactions between the source object or user and target object or user. Hence, an edge may be represented as one or more feature expressions.

III. Content Recommendation System

In one embodiment, the online system 100 includes a content recommendation system 120. The content recommendation system 120 identifies and selects videos from a wide range of publicly available video content items in which a target user is likely to have at least a threshold level of interest. This allows the online system 100 to present the target user with a broader range of content items than the videos posted by other users connected to the target user, increasing the amount of interaction between the target user and the online system 100. In the embodiment shown in FIG. 2, the content recommendation system 120 contains a social based recommendation module 235, cluster based recommendation module 240, social cluster based recommendation module 245, content features store 250, trend based recommendation module 255, engagement based recommendation module 260, features extraction module 265, filter module 270, and ranking module 275. The depiction of the content recommendation system 120 shown in FIG. 2 is for illustration purpose; other embodiments of the content recommendation system 120 may include additional components or exclude one or more of those shown in FIG. 2. Furthermore, the content recommendation system 120 applies same or similar process to select other types of digital content, e.g., images, texts, as recommended digital content for the target user.

The social based recommendation module 235 selects videos as video candidates for recommendations to a target user from videos associated with the target user's friends in the online system 100. Each video is selected based on one or more selecting criteria; each selected video is a video candidate for recommendation to the target user. In one embodiment, the social based recommendation module 235 uses information from the edge store 230 and action logs 215 as the selecting criteria to select video candidates, where the information describes various aspects of the target user's friends and relationships between the target user and his/her friends in the online system 100. For example, the social based recommendation module 235 retrieves information describing relations between the target user and each of his/her friends from the edge store 230 to select one or more friends of the target user, where the videos associated with the selected friends are further examined. All friends who are directly connected with the target users are selected; among friends who are indirectly connected with the target users, friends who are closer to the target users in a corresponding social graph are more likely to be selected than other friends are farther away from the target user in the social graph.

The social based recommendation module 235 uses information from the action logs 215 of the selected friends of the target user to generate a list of candidate videos for the target user. For example, the social based recommendation module 235 examines the viewing history of video content of each selected friend of the target user, and selects one or more videos that were previously viewed by the selected friend as video candidates for the target user. Other embodiments of the social based recommendation module 235 can use additional information for the video selection, e.g., timing information associated with the videos that were previously viewed by the selected friends and selecting videos that were most recently watched (e.g., within last 15 days from present) by the selected friends. The social based recommendation module 235 may rank the selected video candidates, e.g., based on the degrees of closeness between the target user and his/her friends whose videos were selected.

The cluster based recommendation module 240 selects video candidates for the target user from clusters of videos that were viewed by a number of users of the online system 100, where each cluster has a number of videos that were commonly viewed by a group of users of the online system 100. In one embodiment, the cluster based recommendation module 240 uses information about a user's video viewing history from the action log 215 to form clusters of same or similar videos viewed by users of the online system 100. The cluster based recommendation module 240 selects videos from the clusters of videos as video candidates for the target user. For example, the cluster based recommendation module 240 forms a cluster of videos of swimming events in summer Olympic Games, which were watched by a number of users of the online system 100, and forms another cluster of videos of music talent show "American Idol." The cluster based recommendation module 240 selects a number of videos from each cluster, e.g., 500 videos from the cluster of videos of swimming events in summer Olympic Games and 200 videos from the cluster of videos of music talent show "American Idol," as video candidates for the target user. The number of video candidates to be selected from each cluster can be based on a variety of factors, e.g., number of viewers for each cluster, number of videos in each cluster. The cluster based recommendation module 240 may rank the selected video candidates, e.g., based on the number of viewers associated with each cluster.

The social cluster based recommendation module 245 selects video candidates based on interests or tastes in video content shared between the target user and clusters of users each connected to the target user in the online system 100. In one embodiment, the social cluster based recommendation module 245 groups the target user's friends in the online system 100 into clusters of friends based on user profiles of the target user and his/her friends; each cluster of friends share one or more common characteristics as the target user, e.g., same taste for video content, same or within a threshold distance of a geo location (e.g., home town), same language, same gender, age group or social economic status. The social cluster based recommendation module 245 selects one or more videos from videos that were viewed by a cluster of friends who share some common interest with the target user. For example, if the target user is interested in fishing, the social cluster based recommendation module 245 selects a cluster of friends of the target user, who are also interested in fishing. The social cluster based recommendation module 245 checks the video content viewing histories of the friends in the cluster to identify videos of fishing that were watched by the friends. The cluster based recommendation module 240 selects one or more videos of fishing as video candidates for recommendations to the target user. The social cluster based recommendation module 245 may rank the selected video candidates, e.g., based on the number of common characteristics shared by the target user and the friends in each cluster of friends.

Comparing with the cluster based and social based video candidates selection, the social cluster based recommendation module 245 selects video candidates from videos that were watched by groups of users who are more closely related to the target user. For example, if the target user is friends with users from the same geographic location, e.g., home town friends, the video candidates selected from a cluster of videos associated with this group of friends are likely to be of more interest to the target user than other videos that were watched by other users of the online system 100, who are less closely related to the target user.

The trend based recommendation module 255 selects video candidates from videos that are popular, or trending within the online system 100. In one embodiment, the trend based recommendation module 255 receives information regarding currently trending videos from another module of the online system 100, e.g., the action logger 210, which identifies which videos are popular among the users of the online system based on the user interactions with the videos and/or number of viewers of the videos. In another embodiment, the trend based recommendation module 255 uses a model trained by the machine learning module 220 to identify trending videos based on the information stored in the action log 215. The trend based recommendation module 255 selects one or more videos from the identified trending videos as video candidates for the target user. The trend based recommendation module 255 may rank the selected video candidates, e.g., based on the popularity of the selected video candidates.

The engagement based recommendation module 260 selects video candidates based on the target user's engagement/interactions with videos that were engaged by the target user. In one embodiment, the engagement based recommendation module 260 retrieves information about the target user's actions on video content from the action log 215, where the information describes various interactions with video content associated with the target user. In particular, the engagement based recommendation module 260 can use information such as viewing duration of videos by the target user, for the videos that were viewed by the target user, whether the videos were disliked, liked, commented on or shared, and the like. The engagement based recommendation module 260 selects video which were likely of interest to the target user based on the target user's interactions with the videos. For example, the engagement based recommendation module 260 selects the videos that were liked or shared by the target user. The engagement based recommendation module 260 selects publicly available videos which are similar to the videos liked and/or shared by the target users, e.g., videos of same content but in the native language spoken by the target user, or videos produced by the same content provider. The engagement based recommendation module 260 may rank the selected video candidates, e.g., based on the similarity between a video candidate and a video liked or shared by the target user.

The video candidates selected by the recommendation modules 235, 240, 245, 255 and 260 may contain video content that violates a policy of the online system 100 such as videos containing illegal or inappropriate content for viewing in a working or professional environment or by a particular group of views (e.g., young viewers under certain age). The filter module 270 filters the selected video candidates to identify videos candidates that contain inappropriate content. In one embodiment, the filter module 270 uses various content analysis techniques to identify such inappropriate video candidates. For example, the filter module 270 filters the video candidates based on the source of each video candidate. If a video candidate is from a source known to provide safe videos e.g., National Geography, the filter module 270 determines that the video candidate is not suspicious of containing unsafe content. In another embodiment, the filter module 270 selects sample video frames from a video candidate and uses a trained skin detection classifier to determine whether the video candidate contains nudity, e.g., by comparing the pixels in the sample videos frames with reference images of human skin pixels. In yet another embodiment, the filter module 270 filters the video candidates based on analysis of audio content associated with the video candidates to identify video candidates that contain offensive language or profanity that are commonly considered to be not safe or appropriate for users in the online system 100. In addition, the filter module 270 detects same video candidates recommended by different recommendation modules and removes duplicate video candidates, as well as video candidates that have already been viewed by the target user.

The features extraction module 265 is used to extract features associated with video candidates, e.g., source of a video candidate, number of likes, total number of viewers, total number of completed views, number of the target user's interactions, content descriptions (e.g., tags or topics), and the like. From the extracted features, the feature extraction module 265 may derive additional features associated with each video candidate, such as ratio of number of likes over total number of views, and ratio of number of completed views over a total number of views. The features extraction module 265 then stores the extracted features and derived additional features associated with selected video candidates in the content feature store 250, e.g., as feature sets, which are used by the ranking module 275 to generate ranking scores for the selected video candidates and generate recommendations based on the ranking scores.

The ranking module 275 ranks the video candidates and generates a list of recommendations (i.e., a threshold number of selected video candidates) based on the rankings of the video candidates. In one embodiment, the ranking module 275 generates a ranking score for each video candidate based on features associated with the video candidate, where each feature is a ranking factor. The ranking module 275 can assign different weights to each ranking factor such that the ranking of the video candidates is biased towards ranking factors that are more closely related to the target user. For example, a ratio of number of likes over number of views describing the general public of the online system has less weight than the same type of ratio describing the target user's social clusters of friends. For another example, different weights can be assigned to different features within a same feature set, e.g., a video sourced from National Geography has a higher weight than a video candidate from a less established content provider. In one embodiment, the ranking module 275 uses a model trained by the machine learning module 220 described above to assign weights to different ranking factors such that the selected video candidates are more likely of interest to the target user.

The ranking module 275 generates a ranking score for each video candidate, e.g., by generating an averaged sum of the weights assigned to features of the video candidate. The ranking score associated with a video candidate represents a prediction of the user's interest in the video candidate; a higher ranking score for a video candidate indicates a higher interest in the video candidate by the target user than a video candidate having a lower ranking score. In one embodiment, the ranking score of a video candidate is a numerical value. Based on the ranking scores of the video candidates, the ranking module 275 orders the video candidates, e.g., from the highest ranking score to the lowest ranking score, and selects a threshold number of video candidates, e.g. a top twenty video candidates, as the recommendations for the target user. The ranking module 275 presents the generated recommendations to the target user, e.g., displaying a thumbnail image of each recommended video and a universal resource locator (URL) of the recommended video on a display of the client device 130 of the target user.

IV. Recommendation Process

Figure 3:
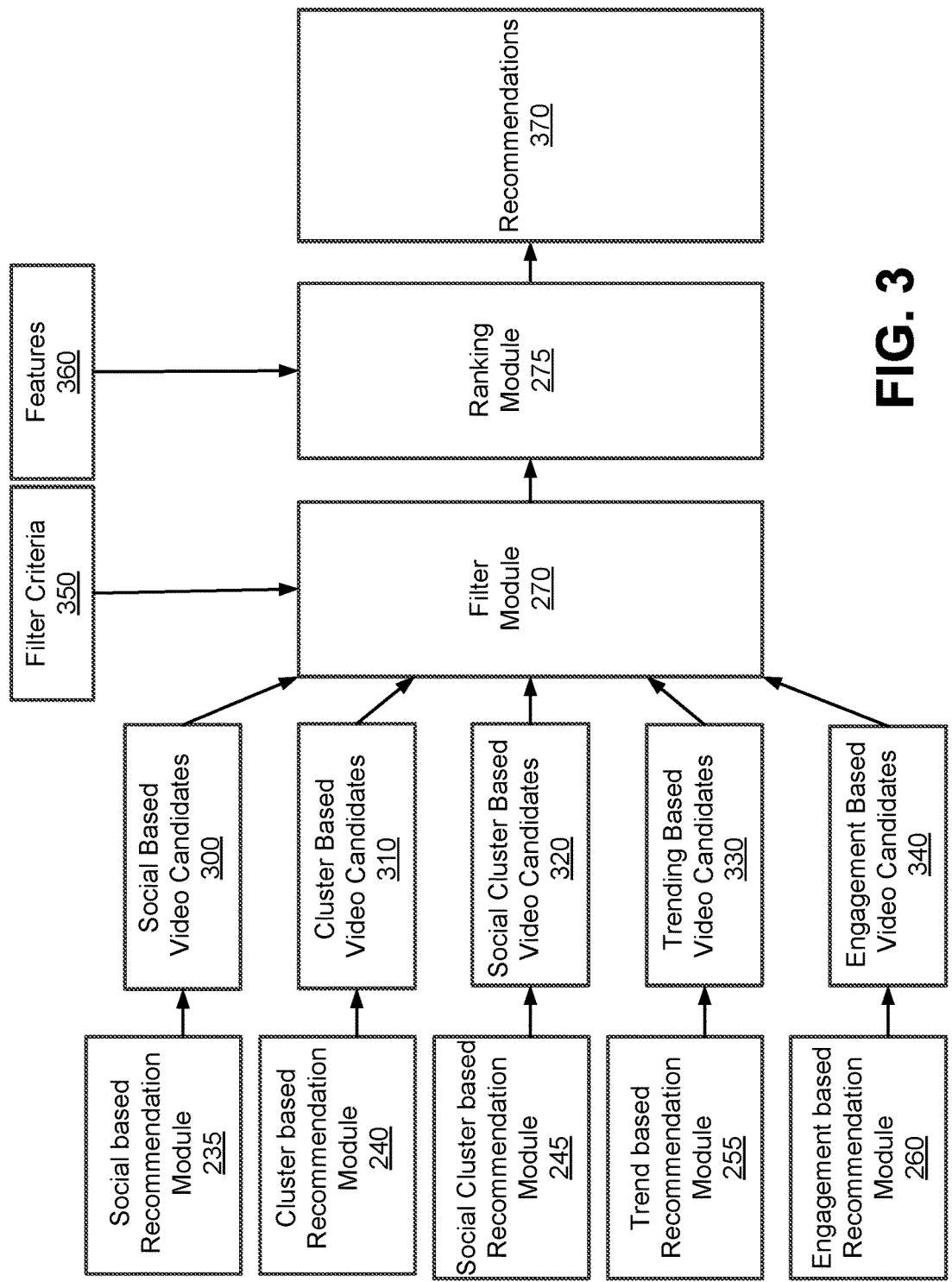
FIG. 3 is a data flow diagram for generating content recommendations according to one embodiment.

FIG. 3 is a data flow diagram for generating content recommendations according to one embodiment. In this embodiment, social based video candidates 300, cluster based video candidate 310, social cluster based video candidates 320, trending based video candidates 330, and engagement based video candidate 340 are generated by their respective recommendation modules 235-260 as described above. These video candidates are filtered by the filter module 270 based on filter criteria 350, such as a policy of the online system 100 that defines videos as containing illegal or inappropriate content for viewing in a working or professional environment or by a particular group of views (e.g., young viewers under certain age). The filter module 270 removes the identified video candidates that violate the policy of the online system 100. The filter module 270 uses information from the user profile store 200 of the target user to identify and remove video candidates that have been previously viewed by the target user. The filter module 270 also removes duplicate video candidates, e.g. those that have been selected by more than one recommendation module.

Video candidates that remain after the filtration process are then assigned a ranking score that is generated by the ranking module 275 based on differently weighted features associated with the video candidates. Based at least in part on the ranking scores associated with the video candidates, the ranking module 275 selects one or more video candidates as recommendations 370 for presentation to the target user.

Figure 4:
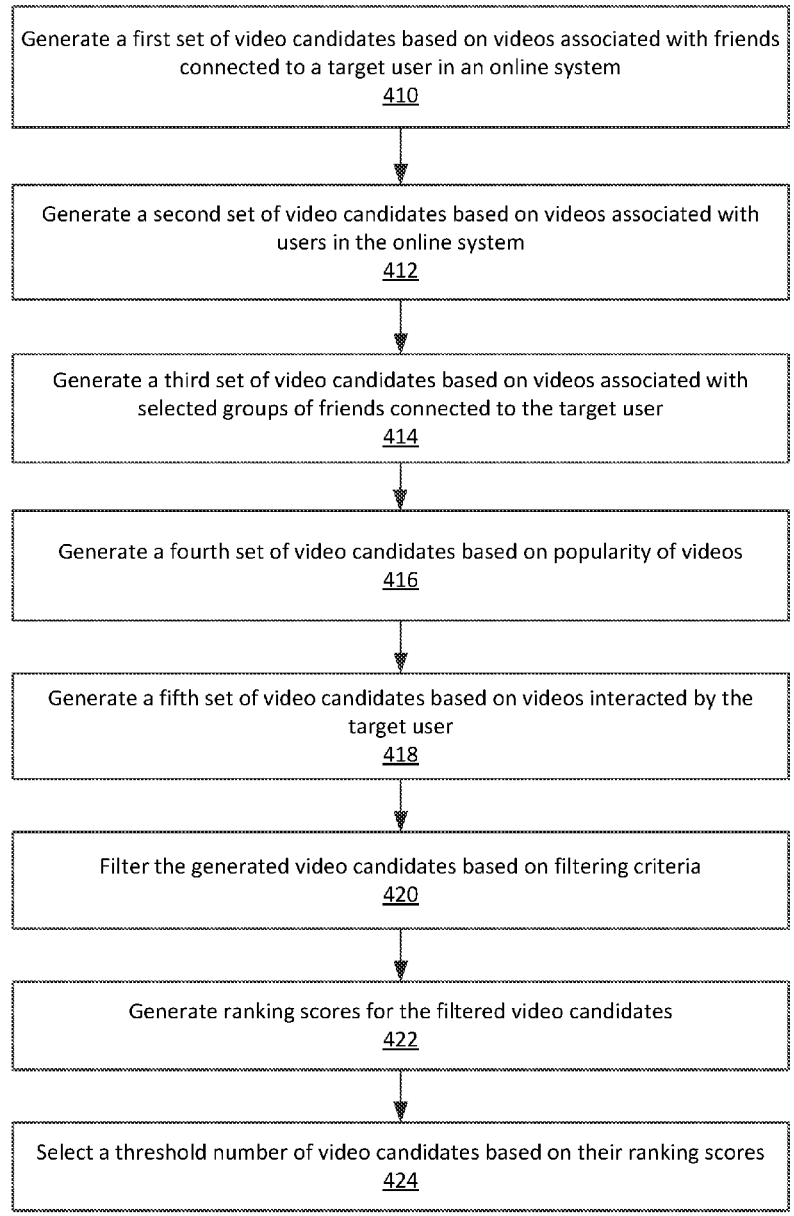
FIG. 4 is a flowchart illustrating a process for generating video recommendations to a target user according to one embodiment.

FIG. 4 is a flow chart illustrating a process for generating video recommendations for a target user according to one embodiment. Initially, the content recommendation system 120 generates 410 a first set of video candidates based on videos associated with the friends connected to a target user in the online system 100, e.g., based on videos that were watched by the target user's friends. The content recommendation system 120 generates 412 a second set of video candidates based on videos associated with users in the online system 100, e.g., based on clusters of videos, where each cluster has one or more videos that were commonly viewed by a number of users of the online system 100. The content recommendation system 120 generates 414 a third set of video candidates based on videos associated with a selected groups of friends connected to the target user in the online system 100, e.g., based on videos watched by a group of friends who share the same taste for video content. The content recommendation system 120 generates 416 a fourth set of video candidates based on popularity of publicly available videos, e.g., videos on a trending topic among users of the online system 100. The content recommendation system 120 generates 418 a fifth set of video candidates based on the target user's interactions with videos that were viewed by the target user, e.g., videos liked or shared by the target user.

The content recommendation system 120 filters 420 the generated video candidates based one or more filtering criteria to identify video candidates containing inappropriate content, duplicate video candidates selected by multiple recommendation modules and video candidates that were already watched by the target user. The content recommendation system 120 generates 422 a ranking score for each filtered video candidate based on features associated with the video candidate. Based on the ranking score of the video candidates, the content recommendation system 120 selects 424 a threshold number of, e.g., top 20 video candidates, as recommendations for presentation to the target user.

V. General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An online system for generating content recommendations for a target user of the system, comprising:
    a processor; and
    a non-transitory computer readable medium configured to store instructions that, when executed by the processor, cause the processor to perform steps comprising:
        maintaining, by the online system, a collection of publicly available videos;
        generating a plurality of sets of video candidates selected from the collection of publicly available videos by:

accessing a plurality of recommendation functions that each apply different types of selection criteria to uniquely select and rank the video candidates for the set that corresponds to that recommendation function, the video candidates each having a ranking score for ranking relative to other video candidates in the set; and receiving, from each recommendation function, the set of video candidates selected and ranked by the recommendation function, each set of video candidates representing video content that is likely to be of interest to the target user, the sets of video candidates selected from the collection of publicly available videos to supplement a display for the target user of other video content posted by the target user's connections in the online system;

filtering the video candidates from the sets from each of the recommendation functions to remove one or more video candidates that violate a video content policy of the online system;

performing a second ranking of the filtered video candidates as a combined group from the sets by:

extracting features from the filtered video candidates;

assigning weights to the features associated with the filtered video candidates, a weight of a feature generated by a ranking model trained on the features of the video candidates, and indicating a relative importance of the feature to the target user;

generating ranking scores for the filtered video candidates based on the weights of the features associated with the filtered video candidates; and selecting a plurality of videos from the filtered video candidates as recommendations to the target user based on the ranking scores associated with the video candidates; and providing for display to the target user the selected videos along with other video content posted by the target user's connections in the online system.

2. The system of claim 1, wherein the plurality of recommendation functions comprise a first recommendation function configured to:

select a plurality of other users who are connected to the target user in the online system; and generate a first set of video candidates selected from a plurality of videos associated with the selected plurality of other users.

3. The system of claim 2, wherein the first recommendation function is further configured to:

select the plurality of videos associated with the selected plurality of other users based on viewing history of the selected videos associated with the selected plurality of other users; and generate the first set of video candidates based on selection of the plurality of videos associated with the selected plurality of other users.

4. The system of claim 1, wherein the plurality of recommendation functions comprise a second recommendation function configured to:

select a plurality of clusters of videos from the collection of publicly available videos, each selected cluster having a plurality of videos commonly viewed by a number of users of the online system; and generate a second set of video candidates selected from the selected plurality of clusters of videos.

5. The system of claim 4, wherein the second recommendation function is further configured to:

select the plurality of clusters of videos based at least on a number of users associated with each cluster of videos; and generate the second set of video candidates based on the selection of the plurality of clusters of videos.

6. The system of claim 1, wherein the plurality recommendation functions comprise a third recommendation function configured to:

select a plurality of clusters of other users who are connected to the target user in the online system, each cluster of other users having a same or similar interest in video content as the target user; and generate a third set of video candidates selected from a plurality of videos associated with the selected plurality of clusters of other users.

7. The system of claim 1, wherein the plurality recommendation functions comprise a fourth recommendation function configured to:

select a plurality of videos that are popular among users of the online system; and generate a fourth set of video candidates selected from the plurality of popular videos.

8. The system of claim 1, wherein the plurality recommendation functions comprise a fifth recommendation function configured to:

select a plurality of videos interacted with by the target user; and generate a fifth set of video candidates based on the selection of the plurality of videos.

9. The system of claim 1, wherein the filtering further comprises:

identifying one or more video candidates that were selected by more than one recommendation functions of the plurality of recommendation functions; and removing identified duplicate video candidates from the selected video candidates.

10. A non-transitory computer readable storage medium having instructions encoded thereon that, when executed by a processor, cause the processor to perform the steps including:

maintaining, by an online system, a collection of publicly available videos;

generating a plurality of sets of video candidates selected from the collection of publicly available videos by:

accessing a plurality of recommendation functions that each apply different types of selection criteria to uniquely select and rank the video candidates for the set that corresponds to that recommendation function, the video candidates each having a ranking score for ranking relative to other video candidates in the set; and receiving, from each recommendation function, the set of video candidates selected and ranked by the recommendation function, each set of video candidates representing video content that is likely to be of interest to the target user, the sets of video candidates selected from the collection of publicly available videos to supplement a display for the target user of other video content posted by the target user's connections in the online system;

filtering the video candidates from the sets from each of the recommendation functions to remove one or more video candidates that violate a video content policy of the online system to generate a plurality of filtered video candidates;

performing a second ranking of the filtered video candidates as a combined group from the sets by:
  extracting features from the filtered video candidates;
  assigning weights to the features associated with the filtered video candidates, a weight of a feature generated by a ranking model trained on the features of the video candidates, and indicating a relative importance of the feature to the target user;
  generating ranking scores for the filtered video candidates based on the weights of the features associated with the filtered video candidates; and
  selecting a plurality of videos from the filtered video candidates as recommendations to the target user based on the ranking scores associated with the video candidates; and
providing for display to the target user the selected videos along with other video content posted by the target user's connections in the online system.

11. The non-transitory computer readable storage medium of claim 10, wherein generating the plurality of sets of video candidates selected from the collection of publicly available videos based on the corresponding set of selection criteria comprises:
  selecting a plurality of other users who are connected to the target user in the online system; and
  generating a first set of video candidates selected from a plurality of videos associated with the selected plurality of other users.

12. The non-transitory computer readable storage medium of claim 10, wherein generating the plurality of sets of video candidates selected from the collection of publicly available videos based on the corresponding set of selection criteria comprises:
  selecting a plurality of clusters of videos from the collection of publicly available videos, each selected cluster having a plurality of videos commonly viewed by a number of users of the online system; and
  generating a second set of video candidates selected from the selected plurality of clusters of videos.

13. The non-transitory computer readable storage medium of claim 10, generating the plurality of sets of video candidates selected from the collection of publicly available videos based on the corresponding set of selection criteria comprises:
  selecting a plurality of clusters of other users who are connected to the target user in the online system, each cluster of other users having a same or similar interest in video content as the target user; and
  generating a third set of video candidates selected from a plurality of videos associated with the selected plurality of clusters of other users.

14. The non-transitory computer readable storage medium of claim 10, wherein generating the plurality of sets of video candidates selected from the collection of publicly available videos based on the corresponding set of selection criteria comprises:
  selecting a plurality of videos that are popular among users of the online system; and
  generating a fourth set of video candidates selected from the plurality of popular videos.

15. The non-transitory computer readable storage medium of claim 10, wherein generating the plurality of sets of video candidates selected from the collection of publicly available videos based on the corresponding set of selection criteria comprises:
  selecting a plurality of videos interacted with by the target user; and
  generating a fifth set of video candidates based on the selection of the plurality of videos.

16. The non-transitory computer readable storage medium of claim 10, wherein filtering the video candidates from the sets from each of the recommendation functions to remove one or more video candidates that violate the video content policy of the online system to generate the plurality of filtered video candidates further comprises:
  identifying one or more video candidates that were selected by more than one recommendation functions of the plurality of recommendation functions; and
  removing identified duplicate video candidates from the selected video candidates.

17. A method for generating content recommendations for a target user of an online system, comprising:
  maintaining, by the online system, a collection of publicly available videos;
  generating a plurality of sets of video candidates selected from the collection of publicly available videos by:
    accessing a plurality of recommendation functions that each apply different types of selection criteria to uniquely select and rank the video candidates for the set that corresponds to that recommendation function, the video candidates each having a ranking score for ranking relative to other video candidates in the set; and
    receiving, from each recommendation function, the set of video candidates selected and ranked by the recommendation function, each set of video candidates representing video content that is likely to be of interest to the target user, the sets of video candidates selected from the collection of publicly available videos to supplement a display for the target user of other video content posted by the target user's connections in the online system;
  filtering the video candidates from the sets from each of the recommendation functions to remove one or more video candidates that violate a video content policy of the online system;
  performing a second ranking of the filtered video candidates as a combined group from the sets by:
    extracting features from the filtered video candidates;
    assigning weights to the features associated with the filtered video candidates, a weight of a feature generated by a ranking model trained on the features of the video candidates, and indicating a relative importance of the feature to the target user;
    generating ranking scores for the filtered video candidates based on the weights of the features associated with the filtered video candidates;
    selecting a plurality of videos from the filtered video candidates as recommendations to the target user based on the ranking scores associated with the video candidates; and
  providing for display to the target user the selected videos along with other video content posted by the target user's connections in the online system.

18. The method of claim 17, wherein generating the plurality of sets of video candidates selected from the collection of publicly available videos based on the corresponding set of selection criteria comprises:
  selecting a plurality of other users who are connected to the target user in the online system; and
  generating a first set of video candidates selected from a plurality of videos associated with the selected plurality of other users.

19. The method of claim 17, wherein generating the plurality of sets of video candidates selected from the collection of publicly available videos based on the corresponding set of selection criteria comprises:
 selecting a plurality of clusters of videos from the collection of publicly available videos, each selected cluster having a plurality of videos commonly viewed by a number of users of the online system; and
 generating a second set of video candidates selected from the selected plurality of clusters of videos.

20. The method of claim 17, wherein generating the plurality of sets of video candidates selected from the collection of publicly available videos based on the corresponding set of selection criteria comprises:
 selecting a plurality of clusters of other users who are connected to the target user in the online system, each cluster of other users having a same or similar interest in video content as the target user; and
 generating a third set of video candidates selected from a plurality of videos associated with the selected plurality of clusters of other users.

21. The method of claim 17, wherein generating the plurality of sets of video candidates selected from the collection of publicly available videos based on the corresponding set of selection criteria comprises:
 selecting a plurality of videos that are popular among users of the online system; and
 generating a fourth set of video candidates selected from the plurality of popular videos.

22. The method of claim 17, wherein generating the plurality of sets of video candidates selected from the collection of publicly available videos based on the corresponding set of selection criteria comprises:
 selecting a plurality of videos interacted with by the target user; and
 generating a fifth set of video candidates based on the selection of the plurality of videos.

* * * * *